(12) United States Patent
Jeong

(10) Patent No.: US 8,730,464 B2
(45) Date of Patent: May 20, 2014

(54) METHOD OF INSPECTING A SUBSTRATE

(75) Inventor: Joong-Ki Jeong, Seoul (KR)

(73) Assignee: Koh Young Technology Inc., Seoul (KR)

( * ) Notice: Subject to any disclaimer, the term of this patent is extended or adjusted under 35 U.S.C. 154(b) by 129 days.

(21) Appl. No.: 13/299,959

(22) Filed: Nov. 18, 2011

(65) Prior Publication Data

US 2012/0127461 A1    May 24, 2012

(30) Foreign Application Priority Data

Nov. 19, 2010  (KR) .......................... 10-2010-0115832

(51) Int. Cl.
G01N 21/00     (2006.01)

(52) U.S. Cl.
USPC .................. 356/237.2; 356/237.1; 356/237.6; 356/601

(58) Field of Classification Search
USPC ..................................... 356/237.2–237.6, 601
See application file for complete search history.

(56) References Cited

U.S. PATENT DOCUMENTS

| | | | |
|---|---|---|---|
| 6,525,331 B1 * | 2/2003 | Ngoi et al. | 250/559.34 |
| 8,054,471 B2 * | 11/2011 | Sciammarella | 356/605 |
| 2004/0246473 A1 | 12/2004 | Hermary et al. | |
| 2007/0177159 A1 * | 8/2007 | Kim et al. | 356/601 |
| 2008/0075328 A1 | 3/2008 | Sciammarella | |
| 2009/0216486 A1 * | 8/2009 | Kim et al. | 702/167 |
| 2010/0008588 A1 | 1/2010 | Feldkhun et al. | |
| 2010/0290060 A1 | 11/2010 | Mohazzab et al. | |
| 2010/0295941 A1 * | 11/2010 | Jeong et al. | 348/135 |

FOREIGN PATENT DOCUMENTS

| | | |
|---|---|---|
| CN | 100501317 | 6/2009 |
| DE | 41 19 744 | 12/1992 |
| JP | 2008-157797 | 7/2008 |
| WO | 96/12160 | 4/1996 |

OTHER PUBLICATIONS

Sai Siva Gorthi et al., "Fringe Projection Techniques: Whither we are?" Optics and Lasers in Engineering, 48(2) pp. 133-140, 2010.

* cited by examiner

*Primary Examiner* — Tarifur Chowdhury
*Assistant Examiner* — Isiaka Akanbi
(74) *Attorney, Agent, or Firm* — Kile Park Reed & Houtteman PLLC

(57) ABSTRACT

A method of inspecting a substrate is disclosed. The method of inspecting a substrate, comprises: obtaining phase data per projecting part with regard to a substrate, by projecting pattern beam onto the substrate having a target object formed thereon through a plurality of projecting parts in sequence; obtaining height data per projecting part with regard to the substrate by using the phase data per the projecting part; setting up a projecting part with highest reliability in the a plurality of projecting parts to be a reference projecting part; modifying height data of remaining projecting part, referenced by height data of the reference projecting part; and obtaining integrated height data by using the modified height data.

9 Claims, 5 Drawing Sheets

METHOD OF INSPECTING A SUBSTRATE

CROSS REFERENCE TO RELATED APPLICATION

This application claims priorities from the benefit of Korea Patent Application No. 10-2010-0115832, filed on Nov. 19, 2010, which is hereby incorporated by references for all purposes as if fully set forth herein.

BACKGROUND OF THE INVENTION

1. Field of the Invention

Exemplary embodiments of the present invention relate to a method of inspecting a substrate or, more particularly, to a method of inspecting a substrate capable of enhancing reliability of a process of inspecting a status of an element mounted on a substrate.

2. Discussion of the Background

In general, an inspection process is required to inspect reliability of a substrate with an electronic device mounted thereon before and after the electronic device is mounted on the substrate. For example, a pad area of a substrate is inspected in order to inspect a status of solder for mounting an electronic device onto the substrate, before the electronic device is mounted on the substrate, and the status of the electronic device is inspected if the electronic device is properly mounted after the electronic device is mounted on the substrate.

Recently, a method of inspecting a substrate has been used for inspecting three dimensional shape of a target object by using an apparatus of inspecting three dimensional shape, which includes a plurality of projecting parts, each of which includes a light source and a grating to project pattern light onto the target object, and a camera capturing an image of the target object.

In order to inspect the three dimensional shape of the target object, height data of the target object is required. The height of the target object is calculated by setting up a ground area of the substrate to be a reference. However, the ground area of the substrate includes noise, so that it is hard to obtain reliable height data. Furthermore, in some cases, a plurality of target objects are disposed densely, so an amount of data of a ground area may be insufficient, or the amount of data of the ground area may be insufficient due to a shadow area. Especially, when the target object is an electronic device with height, a shadow may be generated due to the electronic device, to make amount of data of the ground area, which is reliable, insufficient. As a result, reliability of height of the target object is lowered.

SUMMARY OF THE INVENTION

Therefore, exemplary embodiments of the present invention provide a method of inspecting a substrate, which is capable of improving reliability of integrated height data by modifying height data by using target area together with ground area, even though the amount of data of the ground area, which is obtained by a plurality of projecting part, is insufficient.

Further, exemplary embodiments of the present invention provide a method of inspecting a substrate, which is capable of improving reliability of integrated height data by integrating a plurality of height data obtained by a plurality of projecting part.

Further, exemplary embodiments of the present invention provide a method of inspecting a substrate, which is capable of improving reliability of integrated height data by selecting a projecting part with most reliability and by modifying height data of remaining projecting part with reference the height data of the projecting part with most reliability.

Further, exemplary embodiments of the present invention provide a method of inspecting a substrate, which is capable of improving reliability of integrated height data by modifying height data per projecting part with reference to a region with least variation in a ground area and inspection area of a substrate.

Additional features of the invention will be set forth in the description which follows, and in part will be apparent from the description, or may be learned by practice of the invention.

An exemplary embodiment of the present invention discloses a method of inspecting a substrate, comprising: obtaining phase data per projecting part with regard to a substrate, by projecting pattern beam onto the substrate having a target object formed thereon through a plurality of projecting parts in sequence; obtaining height data per projecting part with regard to the substrate by using the phase data per the projecting part; setting up a projecting part with highest reliability in the a plurality of projecting parts to be a reference projecting part; modifying height data of remaining projecting part, referenced by height data of the reference projecting part; and obtaining integrated height data by using the modified height data.

For example, the reliability in setting up a projecting part with highest reliability in the a plurality of projecting parts to be a reference projecting part, may be evaluated by at least one of visibility and gray scale information having height, signal to noise ratio (SNR), amplitude, average intensity as a parameter.

For example, modifying height data of remaining projecting part, referenced by height data of the reference projecting part, may comprise: obtaining height deviation with regard to height data of the remaining projecting part, referenced by height data of the reference projecting part; and subtracting the height deviation from each height data of the remaining projecting part.

For example, the height deviation may be obtained, referenced by at least one area in an upper area of the target object and a ground area.

For example, prior to obtaining height data per projecting part, the method may further comprise: dividing the substrate into a target object area in which target object is formed and a ground area; setting up phase data of which frequency number in the ground area is most as a representative ground phase with regard to each of the projecting parts; and shifting the phase data per the projecting parts such that the representative ground phase becomes zero with regard to each of the projecting parts.

Another exemplary embodiment of the present invention discloses a method of inspecting a substrate, comprising: obtaining phase data per projecting part with regard to a substrate, by projecting pattern beam onto the substrate having a target object formed thereon through a plurality of projecting parts in sequence; obtaining height data per projecting part with regard to the substrate by using the phase data per the projecting part; setting up a projecting part with highest reliability in the a plurality of projecting parts to be a reference projecting part; modifying height data of remaining projecting part with regard to the height data of the reference projecting part with reference to an upper area of the target object; and obtaining integrated height data by using height data modified with reference to the upper area of the target object.

For example, the reliability in setting up a projecting part with highest reliability in the a plurality of projecting parts to be a reference projecting part, is evaluated by at least one of visibility and gray scale information having height, signal to noise ratio (SNR), amplitude, average intensity as a parameter.

For example, prior to obtaining height data per projecting part, the method may further comprise: dividing the substrate into a target object area in which target object is formed and a ground area; setting up phase data of which frequency number in the ground area is most as a representative ground phase with regard to each of the projecting parts; and shifting the phase data per the projecting parts such that the representative ground phase becomes zero with regard to each of the projecting parts.

For example obtaining integrated height data, may comprise: modifying the height data per the projecting parts again with reference to a ground area of the substrate.

According to the method of inspecting a substrate, a plurality of height data obtained through a plurality of projecting parts is integrated to obtain the integrated height data of the target object. Therefore, reliability of the integrated height data is improved.

Further, even when a plurality of target objects is densely disposed so that the ground area is insufficient, the reliability of the integrated height data is improved by using data of a target object area together with the ground area.

Further, even when the data of a ground area is insufficient, which is obtained by a plurality of projecting parts, due to noise data, target object area, the reliability of the integrated height data is improved by using data of a target object area together with the ground area.

Further, even when the data of a ground area is insufficient, which is obtained by a plurality of projecting parts, due to immeasurable area such as shadow area, the reliability of the integrated height data is improved by using data of a target object area together with the ground area.

Further, in modifying measurement data obtained through a plurality of projecting parts, the measurement data is modified by using height data per projecting part, so that all area of the substrate may be used as a reference area for modification. Therefore, amount of data may increase compared with using only phase data of ground area, to improve reliability of modification of phase data per projecting part or height data per projecting part.

Further, in modifying height data per projecting part, height data of remaining projecting part is modified with reference to height data of a projecting part with highest reliability, so that reliability of integrated height data is improved.

Further, reliability of integrated height data is improved by modifying height data per projecting part with reference to an upper area of a target object, which has relatively less height variation compared with ground area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
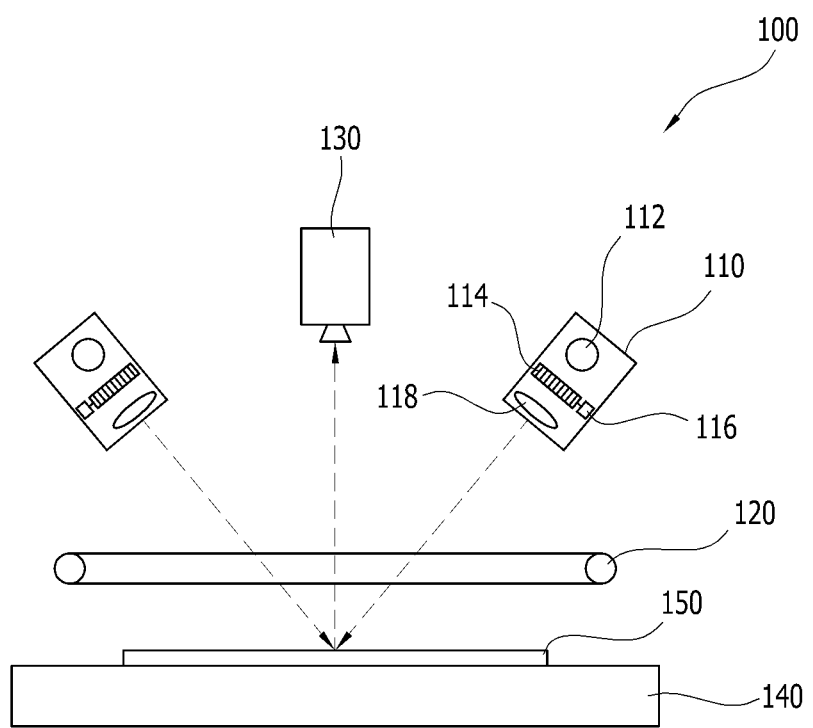
FIG. 1 is a schematic view showing a substrate-inspecting apparatus.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, the present invention will be explained in detail, referring to figures.

FIG. 1 is a schematic view showing a substrate-inspecting apparatus.

Referring to FIG. 1, a substrate-inspecting apparatus 100 according to an exemplary embodiment of the present invention includes a stage 140 supporting and transferring a substrate 150 on which a target object is formed, a plurality of projecting parts 110 projecting a pattern light onto the substrate 150 and a camera 130 capturing an image of the substrate 150. Alternatively, the substrate-inspecting apparatus 100 may further include an illuminating part 120 disposed adjacent to the stage 140 to illuminate the substrate 150 as distinct from the projecting parts 110.

The projecting parts 110 projects pattern light toward the substrate 150 in order to measure three dimensional shape of the target object formed on the substrate 150. For example, projecting part 110 includes a light source 112 generating light, a grating 114 transferring the light generated by the light source 112 into pattern light, a grating shifter 116 shifting the grating 114 and a lens 118 focusing the pattern light transformed by the grating 114 to the target object. The grating 114 may be shifted by $2\pi/N$ (N is a natural number more than two) for shifting phase of the pattern light through the grating shifter 116 such as a piezo actuator (PZT). The projecting parts 110 with the above mentioned structure are disposed along a circumference with reference to the camera 130 such that the projecting parts 110 are spaced apart from each other to enhance accuracy. The plurality of projecting parts 110 are disposed in an inclined direction with respect to the substrate 150 to project pattern light toward the substrate 150 in a plurality of directions.

The illuminating part 120 may have a circular shape and be disposed adjacent to the stage 140. The illuminating part 120 illuminates the substrate 150 for initial alignment of the substrate 150 or setting up inspection area. For example, illuminating part 120 may include a fluorescent lamp generating white light, or a red LED, a green LED and a blue LED generating red light, green light and blue light, respectively.

The camera 130 captures images of the substrate 150 when the projecting part 110 projects pattern light toward the substrate 150, and when the substrate 150 is illuminated by the illuminating part 120. For example, the camera 130 is disposed directly over the substrate 150. The camera 130 may include a CCD camera or a CMOS camera.

The substrate-inspecting apparatus 100 having the above mentioned structure measures three dimensional image and two dimensional image by capturing images through the camera 130 when the projecting part 110 projects pattern image toward the substrate 150 and when the substrate 150 is illuminated by the illuminating part 120, respectively.

When the plurality of projecting parts 110 are adopted by the substrate-inspecting apparatus 100, data such as phase data and height data measured by each of the plurality of projecting parts 110 may be different from each other due to deviation of position and characteristics. Therefore, it is required to merge the data corresponding to the plurality of projecting parts 110 in order to obtain exact integrated height data of the target object formed on the substrate 150.

Figure 2:
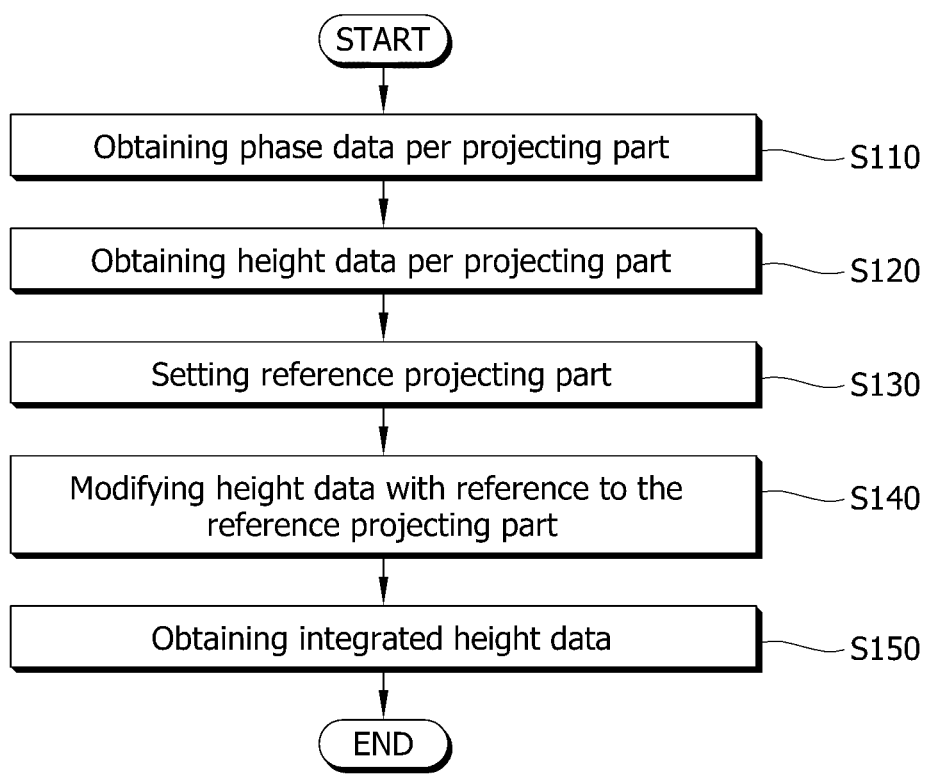
FIG. 2 is a flow chart showing a method of inspecting a substrate according to an exemplary embodiment of the present invention.
Figure 3A:
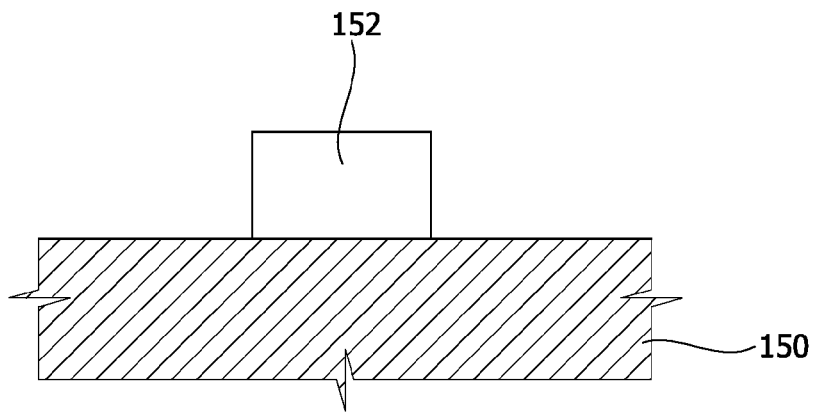
FIG. 3A and FIG. 3B are a cross sectional view and a plan view showing a substrate on which a target object is formed thereon, respectively.
Figure 3B:
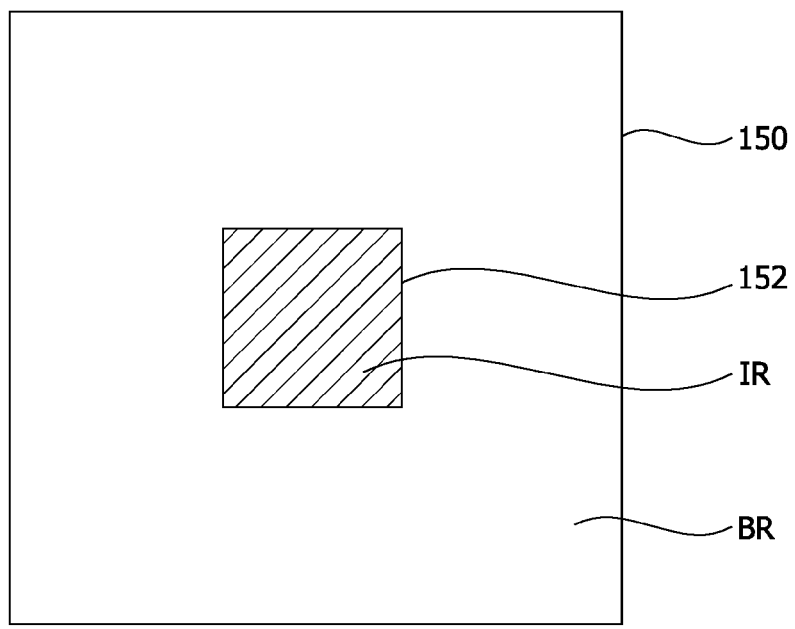

FIG. 2 is a flow chart showing a method of inspecting a substrate according to an exemplary embodiment of the present invention, and FIG. 3A and FIG. 3B are a cross sectional view and a plan view showing a substrate on which a target object is formed thereon, respectively.

Referring to FIG. 1, FIG. 2, FIG. 3A and FIG. 3B, in order to obtain the integrated height data of the substrate 150 with the target object 152, phase data per the projecting part are obtained by projecting pattern light toward the substrate 150 with the target object 152, shifting the phase of the pattern light through the plurality of projecting parts 110 (S110). For example, the target object 152 may be an electronic device with height.

In detail, when one of the plurality of projecting parts 110 projects pattern light toward the substrate 150, shifting the phase of the pattern image, the camera 130 captures an image in sequence, and other one of the plurality of projecting parts 110 and the camera 130 perform the same process to obtain the phase data per projecting part. For example, the substrate-inspecting apparatus 100 may obtain the phase data per projecting part through the phase-shift moiré method. For example, after projecting pattern light toward the substrate 150 N-times, shifting the phase of the pattern light by each of the projecting part 110 and capturing images of the substrate 150, the phase data per projecting part is obtained by using the images through N-bucket algorithm.

Then, a height data per projecting part, which regards to the substrate 150 with the target object 152, is obtained by using the phase data per the projecting parts (S120). For example, the height data per the projecting parts may be obtained by multiplying a scale factor corresponding to each projecting part 110 to the phase data per projecting part.

Figure 4A:
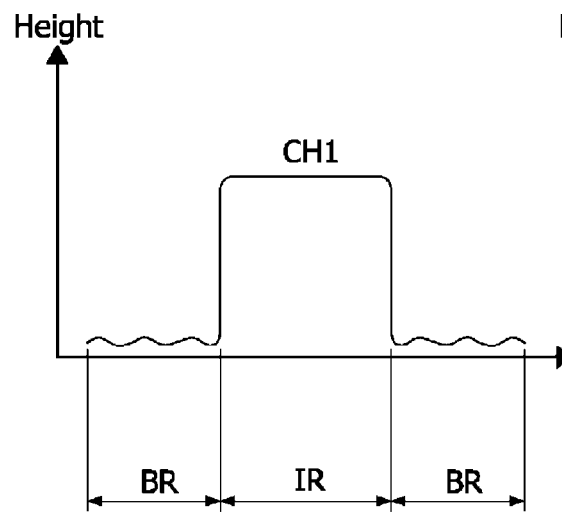
FIG. 4A and FIG. 4B show height data corresponding to a first projecting part (CH1) and a second projecting part (CH2), respectively.
Figure 4B:
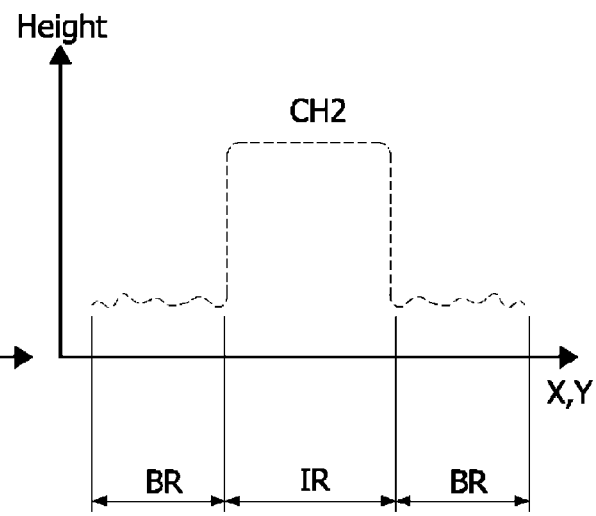

FIG. 4A and FIG. 4B show height data corresponding to a first projecting part (CH1) and a second projecting part (CH2), respectively. The height data corresponding to a first projecting part (CH1) is shown in FIG. 4A and the height data corresponding to a second projecting part (CH2) is shown in FIG. 4B.

Referring to the height data per projecting part obtained by multiplying the scale factor to the height data per projecting part, there is deviation between the height data per projecting part. That is because there is difference between phase data per projecting part due to data difference caused by noise, shadow, etc. In FIGS. 4A and 4B, only two the height data per projecting part are illustrated for convenience of explanation, but the height data per projecting part may be increased according to the number of the projecting parts 110.

Therefore, in order to merge the height data per projecting part corresponding to the plurality of projecting parts 110 to get the integrated height data, the height data per projecting part with different deviation are required to be modified.

When the phase data corresponding to each of the plurality of projecting parts 110 is basically intended to be modified, only the phase data of a ground area can be used. That is because the grating 114 of each of the projecting parts 110 has different wavelength, so that the scale factors of each of the projecting parts 110 are different from each other. Therefore, the phase data per projecting part before being applied by the scale factor may be shifted with reference to a representative ground phase that is reference of measuring height, by subtracting the representative ground phase from the phase data per projecting part in each of the projecting part 110, but the phase data of each of the plurality of projecting parts 110 cannot be compared or operated with each other. Therefore, according to the present invention, the height data per projecting part is modified through one of the height data as a reference, so that the height data of the plurality of projecting parts may be compared or operated with each other to obtain the integrated height data with improved reliability.

In order to modify the height data per projecting part, a projecting part with best reliability firstly is set up to be a reference projecting part in the plurality of projecting parts 110 (S130). The reliability of the projecting parts 110 may be evaluated by using at least one of visibility information and gray scale information that are functions having height, signal to noise ratio (SNR), amplitude, average intensity as a parameter.

In real case, the image per projecting part captured by the camera 130 includes a physical noise area induced by an alien substance, translucent area, etc., or a noise area induced by exceeding the normal distribution of intensity. This kind of noises may induce distortion of measurement of the height of the target object 152. Therefore, after obtaining the noise area by using the visibility information and the gray scale information that are functions of parameter with height, signal to noise ratio (SNR), amplitude, average intensity that are obtained per the projecting part 110, a projecting part 110 with least noise area is set up to be the reference projecting part.

After setting up the reference projecting part, the height data of remaining projecting parts are modified based on the reference of the height data of the reference projecting part (S140).

Figure 5:
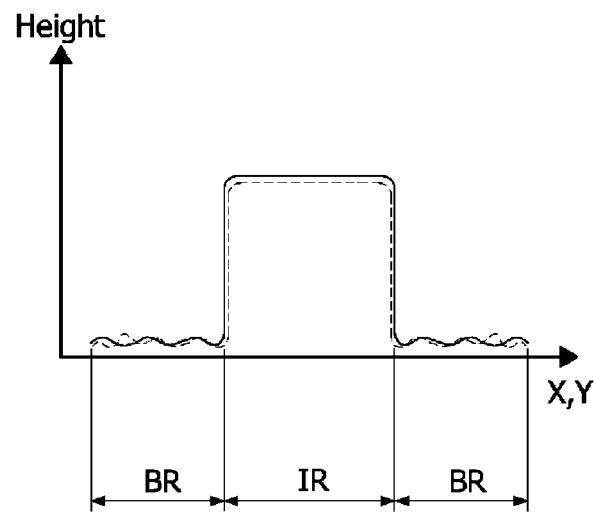
FIG. 5 shows height data where the height data of FIG. 4A and FIG. 4B are modified together.

FIG. 5 shows height data where the height data of FIG. 4A and FIG. 4B are modified together.

Referring to FIG. 4A, FIG. 4B and FIG. 5, when a first projecting part (CH1) is set up to be the reference projecting part as a result of reliability evaluation regarding to the projecting parts 110, the height data of the remaining projecting part (CH2) is modified with reference to the height of the first projecting part (CH1). For example, after obtaining deviation of the height data of the remaining projecting part (CH2) with reference to the height data of the reference projecting part (CH1), the height data of the remaining projecting part (CH2) is modified by subtracting the deviation from the height data of the remaining projecting part (CH2).

On the other hand, in obtaining the height deviation of the remaining projecting part (CH2) with reference to the height data of the reference projecting part (CH1), at least one of an upper area IR of the target object 152 and a ground area BR of the substrate 150 may be used as a reference.

As an exemplary embodiment, the height deviation of the remaining projecting part (CH2) with reference to the height of the reference projecting part (CH1) is obtained by setting up the upper area IR of the target object 152 as a reference. In real cases, the ground area BR of the substrate 150 includes a wiring pattern, a silk screen pattern, a solder resist, etc. inducing relatively heavy height variation, but the upper area IR of the target object 152 has relatively less height variation. Therefore, when the height deviation is obtained with reference to the upper area IR of the target object 152, the reliability of modification of height data is improved.

On the other hand, when the height variation in the ground area BR of the substrate 150 is stable, the ground area BR also may be used as a computing area of the height deviation. In choosing the computing area of the height deviation between the upper area IR of the target object 152 and the ground area BR of the substrate 150, the computing area of the height deviation may be chosen manually by an operator or automatically by calculating the height deviation. That is, by calculating the height variation of the upper area IR of the target object 152 and the ground area BR of the substrate 150 live in real time, an area of less height variation is may be used. Alternatively, when both areas have small height variation, the both areas may be used.

After the height data per projecting part is modified, the integrated height data regarding the substrate 150 having the target object 152 formed thereon is obtained by using the modified height data (S150). The integrated height data may be obtained by averaging, weighted averaging or logical median of the modified height data.

On the other hand, when the height data per projecting part is modified by using the upper area IR of the target object 152 as a reference, the height data per projecting part of the ground area BR may still have minute height deviation. Therefore, after obtaining the representative ground height through averaging, weighted averaging or logical median regarding the height data of the ground area BR, the height data per projecting part may be modified again by using the representative ground height as a reference to further improve reliability of the height data.

Additionally, when only the data with relatively high reliability are used, the reliability of the integrated height data may be more improved in modifying the height data per projecting part.

On the other hand, before obtaining the height data per the projecting parts, the phase data per projecting part 110 may be modified. In order for that, a target object area IR where the target object 152 is formed and a ground area BR where the target object 152 is not formed are set up in the substrate 150.

For example, setting up the target object area IR and the ground area BR may be performed based on the image data obtained by receiving light irradiated toward and reflected by the substrate 150, or based on the reference data of the substrate 150. Alternatively, the target object area IR and the ground area BR may be set up in an inspection area which is previously set up in the substrate 150.

CAD data containing basic information regarding to the substrate 150 may be used as the reference data. Further, design data for manufacturing PCB, manufacturing data, gerber data, PCB design file, various data (ODB++ or extraction file per each CAD design tool) of standard and non-standard type, which is extracted from the PCB design file may be used as the reference data. Additionally, information obtained from image file of a bare board or a mounting board, which is captured by a camera, may be used as the reference data. The reference data contains position information of a pad, a conducting pattern, a via hole, a target object, etc. formed on the substrate 150. Therefore, by using the reference data, the ground area BR of the substrate 150 may be estimated and set up.

Then, the phase data of the ground area BR, of which frequency number is most, is set up to be a representative ground phase in regards to each of the projecting parts 110. Then, the phase data per the projecting part is shifted such that the representative ground phase becomes zero by subtracting the representative ground phase from the phase data per the projecting parts in regards to each of the projecting parts 110. As described above, when the phase of the ground area BR is adjusted to be zero in regards to each of the phase data per projecting part before modifying the height data per projecting part, the reliability of the integrated height data that is finally obtained may be highly improved.

FIG. 6A through FIG. 6H show a process of generating integrated height data of substrate according to an exemplary embodiment of the present invention.

Figure 6A:
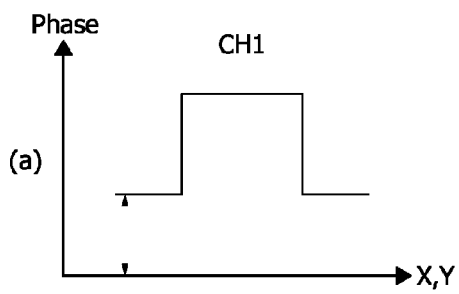
FIG. 6A through FIG. 6H show a process of generating integrated height data of substrate according to an exemplary embodiment of the present invention.
Figure 6B:
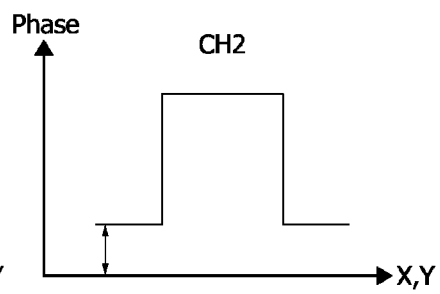

Referring to FIG. 1, FIG. 3 and FIG. 6A through FIG. 6H, pattern light is irradiated onto the substrate 150 having the target object 152 formed thereon through the plurality of projecting parts 110 in sequence to obtain the phase data per projecting part of the substrate 150 (FIG. 6A and FIG. 6B).

Figure 6C:
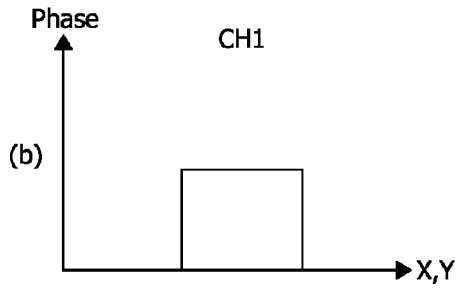
Figure 6D:
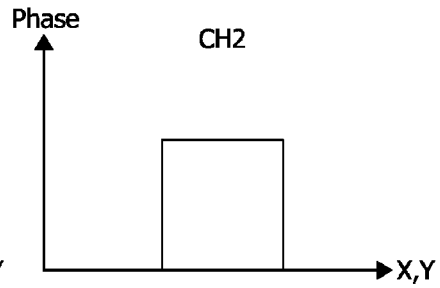

Then, the target object area IR, on which the target object 152 is formed, and the ground area BR are separated in the substrate 150. Then, the phase data, of which frequency number is most, is set up to be the representative ground phase in the ground area BR in regard to each of the projecting parts 110. Then, the phase data per the projecting part is shifted such that the representative ground phase becomes zero in regards to each of the projecting parts 110 (FIG. 6C and FIG. 6D).

Figure 6E:
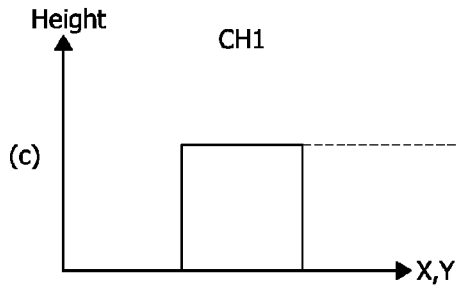
Figure 6F:
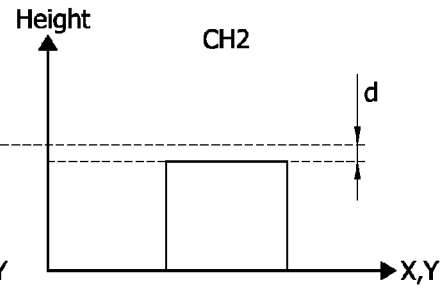

Then, the height data per projecting part regarding to the substrate 150 is obtained by using the shifted phase data per projecting part (FIG. 6E and FIG. 6F). In this case, there may be deviation between the height data per projecting part, so that it is required to modify the height data per projecting part in order to obtain reliable integrated height data.

Figure 6G:
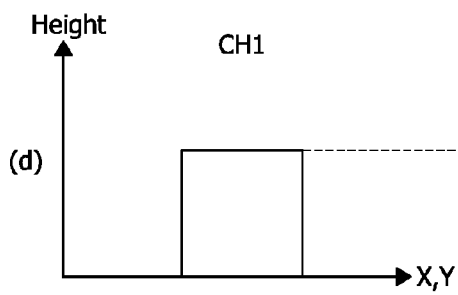
Figure 6H:
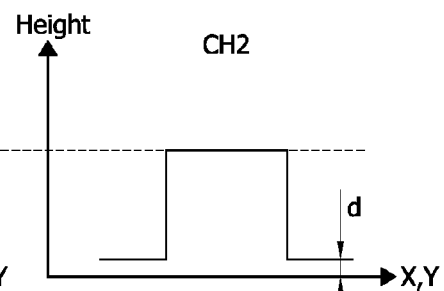

In order to modify the height data per projecting part, the projecting part with the best reliability in the plurality of projecting parts 110 is set up as the reference projecting part. The reference projecting part is set up by evaluating the reliability through at least one of the visibility and the gray scale information having height, signal to noise ratio (SNR), amplitude, average intensity as a parameter. Then, the height data of the remaining projecting part are modified, based on the height data of the reference projecting part, which operates as a reference (FIG. 6G and FIG. 6H). In this case, the modification of the height data may be performed based on the upper area IR of the target object 152, which operate as a reference. Alternatively, the modification of the height data may be performed based on the ground area BR of the substrate 150, or the modification of the height data may be performed based on the total area of the substrate 150, which include the target object area IR and the ground area BR. Alternatively, the modification of the height data may be performed based on the target object area and the ground area in the inspection area.

Then, the integrated height data is obtained by using the modified height data.

According to the present invention, the height data per projecting part is used to improve reliability in modifying data measured through the plurality of projecting parts. That is, both of the ground area and the target object area of the substrate may be used as a reference area in modifying the height data. Therefore, the amount of data is increased compared with the case in which only the phase of the ground area is used, so that accuracy of modification of the phase data per projecting part or height data per projecting part may be improved. Additionally, the height data of the remaining projecting part are modified, referenced by the projecting part with highest reliability in modifying the height data per projecting part to further improve the reliability of the integrated height data. Furthermore, the height data per projecting part is modified, referenced by the upper area of the target object, of which height variation is less than the ground area to further improve the reliability of the integrated height data.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of inspecting a substrate, comprising:
    obtaining phase data per projecting part with regard to the substrate by projecting pattern beam onto the substrate having a target object formed thereon through a plurality of projecting parts in sequence;
    obtaining height data per projecting part with regard to the substrate by using the phase data per projecting part;
    setting up a projecting part with a highest reliability in the plurality of projecting parts to be a reference projecting part;
    modifying the height data of a remaining projecting part in the plurality of projecting parts referenced by the height data of the reference projecting part; and
    obtaining integrated height data by using the modified height data.

2. The method of inspecting a substrate of claim 1, wherein, in the setting up the projecting part with the highest reliability, the reliability of the reference projecting part is evaluated by at least one of visibility and gray scale information having height, signal to noise ratio (SNR), amplitude, average intensity as a parameter.

3. The method of inspecting a substrate of claim 1, wherein the modifying the height data comprises:
    obtaining height deviation with regard to the height data of the remaining projecting part referenced by the height data of the reference projecting part; and
    subtracting the height deviation from each height data of the remaining projecting part.

4. The method of inspecting a substrate of claim 3, wherein the height deviation is obtained referenced by at least one area in an upper area of the target object and a ground area.

5. The method of inspecting a substrate of claim 1, prior to the obtaining the height data per projecting part, further comprising:
    dividing the substrate into a target object area in which the target object is formed and a ground area;
    setting up phase data of which frequency number in the ground area is most as a representative ground phase with regard to each of the projecting parts in the plurality of projecting parts; and
    shifting the phase data per projecting part such that the representative ground phase becomes zero with regard to each of the projecting parts in the plurality of projecting parts.

6. A method of inspecting a substrate, comprising:
    obtaining phase data per projecting part with regard to the substrate by projecting pattern beam onto the substrate having a target object formed thereon through a plurality of projecting parts in sequence;
    obtaining height data per projecting part with regard to the substrate by using the phase data per projecting part;
    setting up a projecting part with a highest reliability in the plurality of projecting parts to be a reference projecting part;
    modifying the height data of a remaining projecting part in the plurality of projecting parts with regard to the height data of the reference projecting part with reference to an upper area of the target object; and
    obtaining integrated height data by using the modified height data.

7. The method of inspecting a substrate of claim 6, wherein, in the setting up the projecting part with the highest reliability, the reliability of the reference projecting part is evaluated by at least one of visibility and gray scale information having height, signal to noise ratio (SNR), amplitude, average intensity as a parameter.

8. The method of inspecting a substrate of claim 6, prior to the obtaining the height data per projecting part, further comprising:
    dividing the substrate into a target object area in which the target object is formed and a ground area;
    setting up phase data of which frequency number in the ground area is most as a representative ground phase with regard to each of the projecting parts in the plurality of projecting parts; and
    shifting the phase data per projecting part such that the representative ground phase becomes zero with regard to each of the projecting parts in the plurality of projecting parts.

9. The method of inspecting a substrate of claim 6, wherein the obtaining the integrated height data comprises:
    modifying the height data per projecting part again with reference to a ground area of the substrate.

* * * * *